H. W. PLEISTER.
CONDUIT OR CABLE CLAMP AND BRIDLE RING.
APPLICATION FILED MAY 7, 1920.
1,365,622.
Patented Jan. 11, 1921.
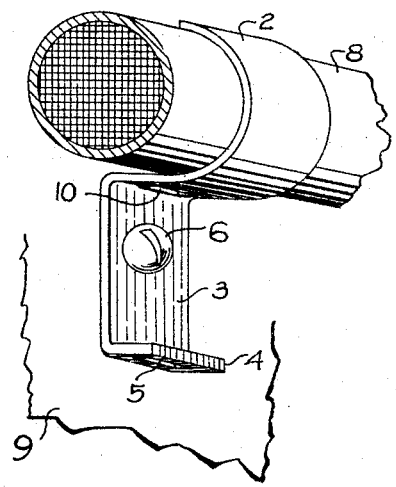
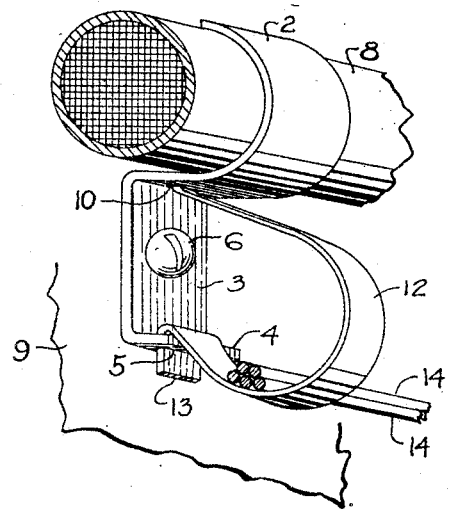
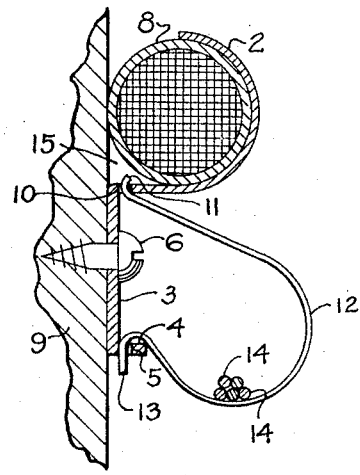
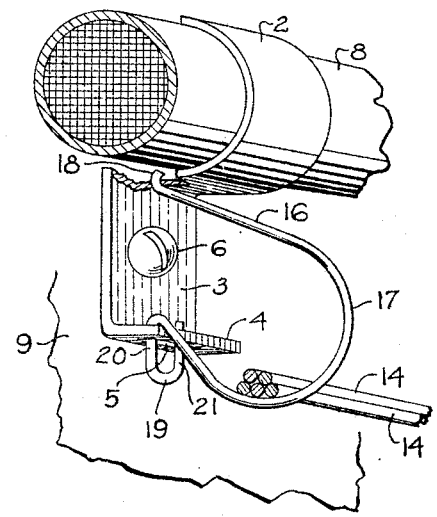
Henry W. Pleister INVENTOR
BY Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, JR., EXECUTOR OF HENRY B. NEWHALL, DECEASED.

CONDUIT OR CABLE CLAMP AND BRIDLE-RING.

1,365,622.      Specification of Letters Patent.      Patented Jan. 11, 1921.

Original application filed January 23, 1920, Serial No. 353,623. Divided and this application filed May 7, 1920. Serial No. 379,518.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

This application is a division of my co-pending application for "improvement in conduit or cable clamp and bridle ring," filed January 23, 1920, Ser. No. 353,623.

My invention relates to the combination of a conduit or cable clamp and bridle ring, and also to a cable or conduit clamp and a bridle ring as sub-combinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a flange having a recess or slot to receive the shank of either a flat bridle ring, or the shank of a wire bridle ring, which has preferably, though not necessarily, been properly bent upon itself to form a U-shaped member. Such a member serves to fill the socket or recess and prevents rattling. My invention further relates to means on the cable clamp for receiving and holding the other end of the bridle ring, whether that bridle ring be formed out of flat sheet material or out of round wire.

My invention further relates to a conduit or cable clamp which is preferably formed out of sheet metal and is provided with co-operating surfaces to receive and hold the two ends of a bridle ring. My invention further relates to bridle rings which are used with my improved conduit and cable clamps.

While my conduit or cable clamp is preferably formed out of pressed sheet material as pressed steel, it may be formed from castings of malleable iron, brass, an alloy, aluminum or any other metal or it may be made out of pressed fibrous material.

My invention further relates to certain combinations, sub-combinations, articles of manufacture, and details of construction, all of which will be more fully hereinafter described and pointed out in the claims.

In the figures in which I have shown one embodiment of my invention, the same reference numerals refer to similar parts in the several figures.

Figure 1 is a perspective view of my conduit and cable clamp and of a cable which it supports;

Fig. 2 is a perspective view of the conduit and cable clamp shown in Fig. 1 with the addition of a bridle ring formed from flat sheet metal;

Fig. 3 is a vertical section through the conduit and cable clamp shown in Fig. 2;

Fig. 4 is a perspective view of one form of wire bridle ring which I may employ.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or sub-combination, and then later, when the needs of the service demand it, my bridle ring may be supported by the same conduit or cable clamp, when the complete combination would be used.

In my invention I form my conduit or cable clamp 1 with a hook portion 2 and a base 3. Preferably, though not necessarily, this conduit or cable clamp is formed of pressed sheet metal. The end of the base 3 I form into a flange 4 and provide it with a recess or slot 5. Preferably this recess or slot is rectangular to receive one end of the bridle ring. When the conduit or cable clamp 1 is formed of pressed sheet material, which is the preferred form, this flange 4 is formed by bending the end of the base 3. This flange lies preferably below the securing screw 6 which holds the clamp and the cable 8 to the wall or other suitable support 9. I also provide the conduit or cable clamp with a hole 10 to receive the upper hook 11 of the flat bridle ring 12.

This bridle ring is preferably, though not necessarily, formed of a strip of spring sheet metal and bent as shown in Fig. 2, its upper end being bent to form the hook 11 and the lower end to form the hook 13.

Ordinarily the conduit or cable clamp 3 at first would be used simply to hold the cable 8 to the wall or other suitable support.

Whenever it becomes necessary to increase the capacity of the installation by stringing bridle wires 14, 14 this can be easily done by hooking the hook 13 of the bridle ring 12 within the slot 5 and then springing the other hook 11 into the hole or slot 10, when the bridle wires 14, 14 can be strung as shown in Fig. 2. It will be noted that in this form of my invention the hooks 13 and 11 fit snugly in the elongated slots 5 and 10, respectively, so that there is no rattling or movement between the cable clamp and the bridle ring after they have once been positioned. Moreover the bridle wires 14, 14 are completely inclosed and cannot work free of the bridle ring. In this form of my invention the hook 11 extends up very slightly into the dead space 15, Fig. 3, so that the hook 11 securely holds one end of the bridle ring but does not touch, cut, scratch or mar the cable 8.

Should it ever be desirable to remove the bridle wires 14, 14 this can be easily done by compressing the bridle ring 12 so as to release the flat hook 11 from the elongated slot 10 which will then permit the hook 13 to be lifted out of the slot 5 in the flange 4.

In some cases I may use a round wire bridle ring 16 as shown in Fig. 4. This wire bridle ring 16 is bent to form a bow 17. One end is bent up to form a hook 18 while the other end is bent back on itself to form a U-shaped hook 19 having two arms 20 and 21. In positioning the hook 19 in the elongated slot 5 in the flange 4, the arms 20 and 21 preferably give slightly so that they are under some slight tension. This serves to prevent rattling of the hook 19 within the slot 5.

This wire bridle ring 16 is applied to and removed from the conduit or cable clamp 3 in the same manner as the flat spring bridle ring 12 of the other figures.

It will be noted that in both forms of my improved construction no tapping or screw-threading of the conduit or cable clamp is required, nor is it necessary to place screw threads upon either of the bridle rings which I employ. This of course saves considerable expense in the manufacture of the article, and reduces the amount of metal necessary to make the conduit or cable clamp.

Having thus described this invention in connection with illustrative embodiments thereof, to the details of which I do not desire to be limited, what is claimed as new and what is desired to secure by Letters Patent is set forth in the appended claims.

What I claimed is:—

1. A conduit or cable clamp provided with a hook portion and a base, and with means to hold one end of a bridle ring, the base being provided with a flange having a slot or recess to receive the other end of a bridle ring.

2. A conduit or cable clamp provided with a hook portion and a base and with means to hold one end of a bridle ring, the base being provided with a flange having a slot or recess to receive the other end of a bridle ring, the flange being located at the lower end of the base.

3. A conduit or cable clamp formed from pressed sheet material having a hook portion and a base, a portion of the base being bent out to form a flange, both the flange and the clamp having means to coöperate with either end of a bridle ring.

4. A conduit or cable clamp formed from pressed sheet material having a hook portion and a base, a portion of the base being bent out to form a flange, both the flange and the clamp having slots or recesses to coöperate with either end of a bridle ring.

5. The combination in a conduit or cable clamp having a hook portion and a base, means on the clamp to secure one end of a bridle ring, a flange provided with a slot to receive the other end of a bridle ring, and a bridle ring having its two ends held by said means and said flange.

6. The combination in a conduit or cable clamp formed of pressed sheet material having a hook portion and a base, the clamp being provided with an opening to receive one end of a bridle ring, the lower end of the base being bent out to form a flange and provided with an opening to receive the other end of a bridle ring, and a bridle ring having its two ends held in said openings.

7. The combination in a conduit or cable clamp of a hook member to engage a cable, a base to lie against a wall or other support, a flange on the base, a bridle ring having two engaging arms, and means on the clamp to removably engage the two ends of said bridle ring and securely hold them against rattling and from disengagement.

HENRY W. PLEISTER.

Witnesses:
MARY R. RYAN,
A. M. WILLIAMS.